Dec. 20, 1932.    A. GORHAN    1,891,593
APPARATUS FOR THE MANUFACTURE OF WATER FREE ETHYL ALCOHOL
Filed Nov. 3, 1931
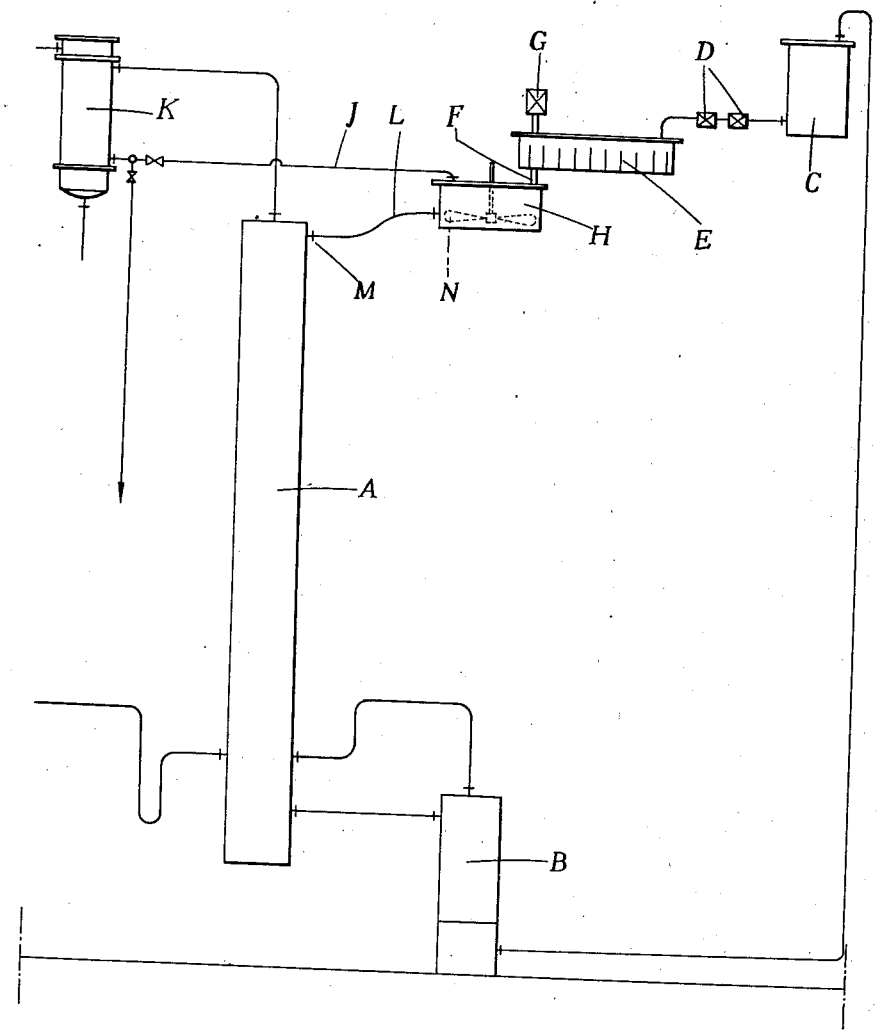
INVENTOR
Dr. A. Gorhan,
BY
E. F. Wenderoth
ATTORNEY Patented Dec. 20, 1932

1,891,593

UNITED STATES PATENT OFFICE

ADOLF GORHAN, OF LIESING, NEAR VIENNA, AUSTRIA, ASSIGNOR TO DEUTSCHE GOLD- UND SILBER-SCHEIDEANSTALT VORMALS ROESSLER, OF FRANKFORT (MAIN), GERMANY, A COMPANY OF GERMANY

APPARATUS FOR THE MANUFACTURE OF WATER-FREE ETHYL ALCOHOL

Application filed November 3, 1931, Serial No. 572,837, and in Germany June 19, 1931.

This invention relates to the production of anhydrous ethyl alcohol.

In the specification of my application for patent Serial No. 480,576 a process is described for the dehydration of ethyl alcohol by the employment of a fusible dehydrating agent in molten form, preferably by applying the countercurrent principle in a dehydrating column.

For carrying out such a process continuously on a large scale, it is necessary that the regeneration of the fusible dehydrating agent be likewise carried out continuously. It is of the utmost importance, for the purpose of obtaining alcohol of at least 99.8% strength, that the charging of the dehydrating column with the dehydrating agent should always take place uniformly. This charging must therefore be rendered as automatic and continuous as possible.

It has already been proposed to regenerate the water-laden dehydrating agent. For example in the case of potassium acetate, the aqueous solution of this salt was concentrated until its boiling point was 155 to 160° C. and was then run into a second receiver where it was allowed to solidify under vacuum whilst, at the same time, its dehydration was thereby completed, whereupon the air was again admitted to the receiver and the solid mass was then dissolved in alcohol on stirring. This process of dehydration was attended by the following disadvantages:—

The solid salt dissolved in the alcohol only slowly, so that a powerful stirring action was necessary for the purpose of accelerating its solution. Furthermore, this method of working can only be carried out periodically. Consequently, in order to ensure a uniform charging of the column, it is necessary always to have at hand a rather large quantity of the dehydrating liquid ready for use in a storage vessel. Finally, the salt always retains water which is not removed before the evacuation and cannot be entirely removed in vacuo. In order, however, to remove just the last tenths of one per cent. of the water, from aqueous alcohol vapour, such vapour must be washed with a thoroughly anhydrous solution or suspension of the dehydrating agent.

It has now been found that this defect in the dehydrated condition of the dehydrating agent can be entirely avoided by carrying out the process in apparatus according to the present invention. It is only by ensuring an entirely automatic and continuous regeneration of the salt solution that a sure and uniform production of anhydrous alcohol of at least 99.8% strength is rendered possible.

The preferred arrangement of apparatus according to the present invention is shown in the accompanying drawing. In this apparatus the water laden dehydrating agent together with some of the alcohol is, after being drawn off from the dehydrating column A, deprived of its alcohol in the separating column or separator B and pumped into the container C. From the container C the water laden dehydrating agent passes through the regulating valve or valves D into a heating pan E in which dehydration and fusion are effected. The molten mass flows continuously through the pipe F into the mixing vessel H. If desired another regulating device G may be interposed between the pan E and the vessel H to control the flow of the molten mass. Into the mixing vessel H there is continually supplied through a pipe J some of the anhydrous alcohol condensed in the condenser K as it leaves the column A in vaporized form. Through the pipe L the alcoholic dehydrating solution flows from the vessel H into the column A which it enters at M. A stirring device is generally superfluous in the mixing vessel H. If, however, it is desired to work the plant at an extraordinarily high rate, the mixing vessel H may be provided with a stirring mechanism N for the purpose of obtaining a uniform concentration of the dehydrating solution.

By regulation at the valve D, and if required, also at the device G and through the pipe J, the quantity and concentration of the dehydrating agent entering the column A can be adjusted to the desired conditions and always be constant. As the salt leaves the pan E only in the molten condition, it is here ensured that the salt that goes into solution is really anhydrous and, consequently, the dehydrating liquid effects complete dehydration of the alcohol in the column.

What I claim is:—

1. Continuously operable system for the dehydration of aqueous alcohol comprising a reaction column in which an alcoholic dehydrator meets aqueous alcohol, a separator for alcohol connected with a lower portion of said reaction column, a container for storing aqueous dehydrator connected with said separator, a condenser connected to an upper portion of said reaction column, a heatable pan having communication with said container, said condenser and with an upper portion of said reaction column, and fluid-flow control means interposed between said pan and said container.

2. Continuously operable system for the dehydration of aqueous alcohol comprising a reaction column in which an alcoholic dehydrator meets aqueous alcohol, a separator for alcohol connected with a lower portion of said reaction column, a container for storing aqueous dehydrator connected with said separator, a condenser connected to an upper portion of said reaction column, a mixing vessel having communication with said reaction column and said condenser, a heatable pan having communication with said mixing vessel and said container and fluid-flow control means interposed between said container and said pan.

3. Continuously operable system for the dehydration of aqueous alcohol comprising a reaction column in which an alcoholic dehydrator meets aqueous alcohol, a separator for alcohol connected with a lower portion of said reaction column, a container for storing aqueous dehydrator connected with said separator, a condenser connected to an upper portion of said reaction column, a mixing vessel having communication with said reaction column and said condenser, a heatable pan having communication with said mixing vessel and said container and fluid-flow control means interposed between said pan and said mixing vessel.

4. Continuously operable system for the dehydration of aqueous alcohol comprising a reaction column in which an alcoholic dehydrator meets aqueous alcohol, a separator for alcohol connected with a lower portion of said reaction column, a container for storing aqueous dehydrator connected with said separator, a condenser connected to an upper portion of said reaction column, a mixing vessel having communication with said reaction column and said condenser, a heatable pan having communication with said mixing vessel and said container and fluid-flow control means interposed between said container and said pan and fluid-flow control means interposed between said condenser and said mixing vessel.

5. Continuously operable system for the dehydration of aqueous alcohol comprising a reaction column in which an alcoholic dehydrator meets aqueous alcohol, a separator for alcohol connected with a lower portion of said reaction column, a container for storing aqueous dehydrator connected with said separator, a condenser connected to an upper portion of said reaction column, a mixing vessel having communication with said reaction column and said condenser, a heatable pan having communication with said mixing vessel and said container, fluid-flow control means interposed between said container and said pan, fluid-flow control means interposed between said pan and said mixing vessel and storing means operable within said mixing vessel.

6. Continuously operable system for the dehydration of aqueous alcohol comprising a reaction column in which an alcoholic dehydrator meets aqueous alcohol, a separator for alcohol connected with a lower portion of said reaction column, a container for storing aqueous dehydrator connected with said separator, a condenser connected to an upper portion of said reaction column, a heatable pan having communication with said condenser, said container and with an upper portion of said reaction column, fluid-flow control means interposed between said pan and said heatable container and fluid-flow control means interposed between said heatable pan and said reaction column.

In testimony whereof I have signed my name to this specification.

ADOLF GORHAN.